US012070784B2

(12) United States Patent
Meichtry

(10) Patent No.: US 12,070,784 B2
(45) Date of Patent: Aug. 27, 2024

(54) METHOD AND DEVICE FOR REMOVING DENTS

(71) Applicant: Ralph Meichtry, Wollerau (CH)

(72) Inventor: Ralph Meichtry, Wollerau (CH)

( * ) Notice: Subject to any disclaimer, the term of this patent is extended or adjusted under 35 U.S.C. 154(b) by 601 days.

(21) Appl. No.: 16/333,184

(22) PCT Filed: Sep. 8, 2017

(86) PCT No.: PCT/EP2017/072576
§ 371 (c)(1),
(2) Date: Mar. 13, 2019

(87) PCT Pub. No.: WO2018/050550
PCT Pub. Date: Mar. 22, 2018

(65) Prior Publication Data

US 2019/0240711 A1 Aug. 8, 2019

(30) Foreign Application Priority Data

Sep. 13, 2016 (CH) ...................................... 1185/16

(51) Int. Cl.
*B21D 1/06* (2006.01)
*H05B 6/06* (2006.01)
(Continued)

(52) U.S. Cl.
CPC ................. *B21D 1/06* (2013.01); *H05B 6/06* (2013.01); *H05B 6/101* (2013.01); *H05B 6/14* (2013.01); *H05B 6/365* (2013.01)

(58) Field of Classification Search
CPC . B21D 1/06; H05B 6/06; H05B 6/101; H05B 6/14
(Continued)

(56) References Cited

U.S. PATENT DOCUMENTS 3,816,690 A 6/1974 Mittelmann
3,895,295 A 7/1975 Mittelmann
(Continued)

FOREIGN PATENT DOCUMENTS

DE 39 27 432 A1 2/1991
DE 43 43 578 A1 6/1995
(Continued)

OTHER PUBLICATIONS

"Magnetic Fields Pop Dents", 903 Machine Design, Cleveland, Ohio, USA, vol. 68, No. 2, Jan. 25, 1996, p. 42.

*Primary Examiner* — Nathaniel E Wiehe
*Assistant Examiner* — Thomas J Ward
(74) *Attorney, Agent, or Firm* — Pauley Erickson & Swanson

(57) ABSTRACT

A method for inducing local heating in a sheet metal structure includes the step of providing a sheet metal structure to be heated. In a further step a magnetic field generator is provided and in a further step the magnetic field generator is positioned adjacent to the sheet metal structure in the area to be treated such that it forms a resonance circuit arrangement together with the sheet metal structure. In a further step at least one calibration current pulse having a specific frequency is applied to the resonance circuit arrangement in order to determine the resonance frequency of the resonance circuit arrangement. In a further step at least one power current pulse is applied to the resonance circuit arrangement with the operation frequency of the current pulse corresponding to the resonance frequency of the resonance circuit arrangement as determined by the at least one calibration current pulse.

30 Claims, 3 Drawing Sheets

(51) Int. Cl.

| | |
|---|---|
| ***H05B 6/10*** | (2006.01) |
| ***H05B 6/14*** | (2006.01) |
| ***H05B 6/36*** | (2006.01) |

(58) Field of Classification Search

USPC ................................ 219/602, 663, 668, 670

See application file for complete search history.

(56) References Cited

U.S. PATENT DOCUMENTS

| | | | | |
|---|---|---|---|---|
| 3,959,619 | A | 5/1976 | Schill | |
| 3,998,081 | A | 12/1976 | Hansen et al. | |
| 4,355,222 | A | 10/1982 | Geithman et al. | |
| 4,754,637 | A | 6/1988 | O'Dell | |
| 4,962,292 | A | 10/1990 | Aoki | |
| 4,986,102 | A | 1/1991 | Hendrickson et al. | |
| 5,046,345 | A * | 9/1991 | Zieve | H03K 3/57 72/56 |
| 5,248,865 | A | 9/1993 | Tyler | |
| 5,266,764 | A | 11/1993 | Fox et al. | |
| 5,660,753 | A | 8/1997 | Lingnau | |
| 6,043,471 | A | 3/2000 | Wiseman et al. | |
| 6,050,121 | A | 4/2000 | Daehn et al. | |
| 6,563,096 | B1 | 5/2003 | Pacholok et al. | |
| 6,684,677 | B1 | 2/2004 | Bar et al. | |
| 6,794,622 | B1 | 9/2004 | Alveberg et al. | |
| 7,857,914 | B2 | 12/2010 | Baann | |
| 9,826,577 | B2 | 11/2017 | Meichtry et al. | |
| 2004/0168495 | A1 | 9/2004 | Berg et al. | |
| 2007/0027353 | A1* | 2/2007 | Ghiron | A61N 2/006 600/9 |
| 2008/0034829 | A1 | 2/2008 | Choe et al. | |
| 2008/0163661 | A1 | 7/2008 | Meichtry et al. | |
| 2010/0225197 | A1* | 9/2010 | Fulford | H02K 1/185 310/216.111 |
| 2016/0044748 | A1 | 2/2016 | Meichtry et al. | |
| 2016/0354973 | A1 | 12/2016 | Ralph et al. | |
| 2018/0103512 | A1 | 4/2018 | Meichtry et al. | |
| 2018/0169966 | A1 | 6/2018 | Meichtry et al. | |

FOREIGN PATENT DOCUMENTS

| | | | |
|---|---|---|---|
| EP | 2 084 939 | A1 | 8/2009 |
| EP | 2 085 161 | A1 | 8/2009 |
| EP | 2 605 616 | A2 | 6/2013 |
| FR | 1419497 | A | 11/1965 |
| WO | WO 99/48334 | A1 | 9/1999 |
| WO | WO 01/10579 | A1 | 2/2001 |
| WO | WO 01/30117 | A1 | 4/2001 |
| WO | WO 2006/119661 | A1 | 11/2006 |
| WO | WO 2016/020071 | A1 | 2/2016 |
| WO | WO 2016/115514 | A1 | 7/2016 |

* cited by examiner

METHOD AND DEVICE FOR REMOVING DENTS

BACKGROUND OF THE INVENTION

Field of the Invention

The present invention relates to a method and a device for removing dents from sheet metal structures, in particular for removing dents from non-ferromagnetic sheet metal structures by means of inductive heating.

Discussion of Related Art

WO 01/10579 A1 in the name of Advanced Photonics Technologies AG was published on 15 Feb. 2001 and discloses a method and device for removing a dent from sheet metal parts. Therefore, a sheet metal part is locally heated by a lamp. The heating takes place in an essentially contactless manner with the aim of causing a mechanical stress gradient which effects the dent to straighten back. The document also discloses applying heat by means of inductive means or by a directed stream of hot air. The device described in detail in this application comprises a hood with a lamp and a reflector.

WO 2006/119661 A1 in the name of Ralph Meichtry was published on 16 Nov. 2006 and discloses a method and a device for removing dents from sheet metal structures based on electromagnetic energy. The device comprises a working head which can be interconnected to a power device by a connecting cable. For the removal of the dents, the working head is positioned in the area to be treated and brought into contact with the sheet metal. Subsequently a magnetic field is applied by the working head, which effects a magnetic force on the sheet metal, leading to deformation of the dent. The device is suited for removing dents from ferromagnetic sheet metal structures.

WO 2016/020071 A1 in the name of Ralph Meichtry was published on 11 Feb. 2016. The document discloses a system to remove dents from ferromagnetic sheet metal structure by local inductive heating, caused by alternating magnetic fields and thereto related local thermal expansion. The system disclosed is particularly suited to remove dents from ferromagnetic sheet metal structures in a precise and user-friendly way.

SUMMARY OF THE INVENTION

The systems known comprise several drawbacks. Heating by radiation, such as by means of lamps, may cause thermal damage to the surfaces which absorb the radiation (e.g. coats of varnish) before the underlying sheet metal is sufficiently heated. As well, the systems using magnetic fields in order to effect magnetic forces on the sheet metal structures can only be applied to ferromagnetic metals and fail if used for non-ferromagnetic metals. The same holds true for systems using conventional inductive means which work properly when used for ferromagnetic materials but fail when used for non-ferromagnetic metals.

Non-ferromagnetic metals include aluminum, magnesium, titanium and copper. However, the invention is not limited to be used for these metals. Within the context of the present invention, “aluminum”, “magnesium”, “titanium” and “copper” should be understood as meaning also their alloys.

The reason why conventional systems for inductive heating fail when being used for non-ferromagnetic sheet metal structures is that they are not able to induce sufficient local heating in the sheet metal structure and hence the mechanical stress gradient required to straighten the dent cannot be formed. Several mechanisms are responsible for this.

The main effect responsible for conventional inductive heating of ferromagnetic sheet metal structures is Hysteresis loss which is caused by the alternating magnetic fields. Hysteresis loss allows highly efficient and spatially concentrated heating of most ferromagnetic metals up to their specific Currie temperature. In non-ferromagnetic materials (respectively non-ferrous materials, such as aluminum) heating by Hysteresis loss is not possible. In these materials heating is mostly induced by means of eddy currents. However, many non-iron based alloys (such as aluminum) have a significantly lower electrical resistance than most iron-based alloys. In addition, as these alloys are non-ferromagnetic, they show a larger skin depth. Consequently, eddy currents induced in these materials will flow in thicker layers, which have a lower electrical resistance than thin layers. Thus, Joule heating in most non-ferromagnetic materials is significantly reduced as well as less spatially concentrated if compared to Joule heating in ferromagnetic materials.

In addition, in particular aluminum has a relatively high thermal conductivity if compared to e.g. most iron-based alloys. Thus, heat generated in aluminum is spatially distributed relatively efficiently, leading to large-area thermal expansion and hence low mechanical stress gradients in the region of a dent to be straightened. Consequently straightening of the dent will not take place.

Furthermore, induction of high currents in sheet metal structures made form non-iron based materials in many cases also fails because the resonance frequency of a resonant circuit arrangement built by a magnetic field generator and the sheet metal structure depends on the dissipation resistance of the sheet metal structure, which itself strongly depends on the geometry of the sheet metal, respectively a dent present in the sheet metal structure. Hence induction of high eddy currents fails due to detuning effects.

Consequently, some of the most cost- and time-efficient conventional systems for dent removal in iron-based sheet metal structures fail when being used in sheet metal structures made from e.g. aluminum. Hence, due to the emerging of eco-friendly lightweight vehicles comprising bodies made from sheet metal structures made from aluminum, efficient methods and devices are needed in order to remove dents also from these structures.

It is one purpose of the present invention to provide a method for inducing local heating in a sheet metal structure, in particular in sheet metal structures made from non-ferromagnetic metals, such as aluminum.

It is another purpose of the present invention to provide a device for carrying out such a method.

It is yet another purpose of the present invention to provide a working head for such a device.

The method, device and working head as described herein are particularly suitable for dent removal in sheet metal structures made from non-ferromagnetic materials, such as aluminum, but may also be used for other materials (including ferromagnetic materials). The present invention may also be used in order to heat a (ferromagnetic as well as non-ferromagnetic) sheet metal structure locally, e.g. in order to remove a sticker attached to its surface and/or to loosen or break an adhesive connection. In particular the invention as described herein may also be used in order to treat sheet metal structures (ferromagnetic as well as non-ferromagnetic) which comprise certain types of coats of varnish that are sensitive to heat and/or comprise components that are sensitive to alternating magnetic fields.

In order to provide a concise description of the invention, the invention is herein described mainly for being used with sheet metal structures. However, although in particular being highly suitable for sheet metal structures, it is not limited to sheet structures and may also be used in order to induce heating in other types of structures.

A method for inducing local heating in a sheet metal structure according to the present invention usually comprises the method step of providing a sheet metal structure comprising an area to be heated. In a further method step a magnetic field generator is provided. In a further method step the magnetic field generator is positioned adjacent to the sheet metal structure in the area to be treated (respectively heated) such that it forms a resonance circuit arrangement together with the sheet metal structure. In a further method step at least one calibration current pulse having a specific frequency is applied to the resonance circuit arrangement in order to determine (or at least approximate) the resonance frequency of the resonance circuit arrangement. The resonance frequency may be determined based on the frequency response of the resonant circuit arrangement to the calibration current pulse or e.g. by measuring the output current of a power supply unit that provides the resonance circuit arrangement with power. Multiple calibration current pulses may be applied individually or in combination, as will be explained in more detail below. In a further method step, at least one power current pulse is applied to the resonance circuit arrangement with the operation frequency of the current pulse corresponding to the resonance frequency of the resonance circuit arrangement as determined by the at least one calibration current pulse. A power current pulse will usually be formed in order to induce high eddy currents in the sheet metal structure at the area to be treated, whereby a calibration current pulse will usually be formed in order to prevent induction of high eddy currents. Good results may be obtained if the operation frequency of the current pulse is equal or almost equal to the resonance frequency of the resonance circuit arrangement.

Hence, the method according to the invention allows to account for the fact that the dissipation resistance of a sheet metal structure to be treated depends on multiple factors, including the type of alloy and thickness of the sheet metal structure (which both are not always known), as well as the exact geometry of the area to be treated, which area may have a curvature and/or highly irregular shape/geometry (e.g. in case a dent has to be treated). Thanks to the method according to the present invention highly efficient power transmission to the area to be treated of the sheet metal structure can be obtained, leading to efficient heating. Hence, the method according to the present invention can also be executed using relatively small devices if compared to the conventional methods which can only be executed on relatively large and heavy devices, which usually cannot be formed as handheld devices. Thus user-friendly local heating of sheet metal structures made from non-ferromagnetic materials becomes possible.

Hence, the frequency of the alternating current output provided by e.g. a power supply unit can be tuned precisely to the resonance frequency (or at least sufficiently close to the resonance frequency in order to obtain high eddy currents) of the resonant circuit arrangement. Thus maximum power throughput and consequently maximum heating induced in the sheet metal structure can be obtained.

Precise calibration and efficient induction of heat in a sheet metal structure may be obtained if calibration current pulses and/or power current pulses with an at least approximately sinusoidal (amplitude) modulation (100%) are used.

Good results may be obtained if a sequence of calibration current pulses is applied to the resonance circuit arrangement in order to determine the resonance frequency of the resonance circuit arrangement. Hence multiple subsequent calibration current pulses (preferably each with a different frequency) may be applied and the resonance frequency e.g. be determined subsequently based on the set of frequency responses for these current pulses. Alternatively or in addition during a calibration current pulse, the operation frequency may sweep from a chosen start frequency to a chosen end frequency. Good results for various types of sheet metal structures made from aluminum may be obtained if the start frequency is about 58 kHz (kilohertz) and the end frequency is about 62 kHz (kilohertz).

In order to obtain a particularly high heating effect in a sheet metal structure made from aluminum, the current pulses of the calibration sequence of current pulses may have frequencies that differ from each other and that are between 58 kHz (kilohertz) and 62 kHz (kilohertz). Depending on the type of material as well as the geometry of the dents, also current pulses with frequencies between 59 kHz and 61 kHz may be applied. Other ranges of frequencies may be applied.

Good results for dents with various geometries may be obtained if the calibration sequence of current pulses comprises between 10 and 20 current pulses.

A precise determination of the resonance frequency of a large group of sheet metal structures may be obtained if the duration of each current pulse of the calibration sequence of current pulses is between 15 ms (milliseconds) and 20 ms (milliseconds).

A method that can be applied to a large group of sheet metal structures and which can be executed with a relatively simple device uses a sequence of power current pulses that has an envelope of modulation of 50 Hz (hertz) and an operation frequency that is equal to the resonance frequency of the resonant circuit arrangement. Thus in many cases relatively simple electronic circuits and devices with relatively small outer dimensions and low weight can be applied, in particular if 100% amplitude modulation is applied and power is provided by a mains electricity system with a frequency of 50 Hz. For other types of mains electricity systems also different envelopes of modulation may be used, such as e.g. 60 Hz (hertz).

In order to prevent overheating of a sheet metal structure to be treated and/or a device for dent removal, two sequences of power current pulses may be separated by a minimum time period. The minimum time period may be controlled/set by a control unit based on measurements of the temperature at the working head and/or at the sheet metal structure. Alternatively or in addition the minimum time period may be set by an operator.

Alternatively or in addition the number of power current pulses and/or the maximum total duration of the sequence of power current pulses may be preset. This number and/or the duration may be set by an operator and/or may be controlled by a control unit.

Alternatively or in addition, power may be controlled by pulse amplitude modulation and/or by detuning.

A device for carrying out the method as described herein may comprise a power supply unit configured to provide an alternating current and at least one working head with an magnetic field generator for generating a magnetic field, the working head being electrically interconnected with the power supply unit. The device will usually also comprise a control unit to control operation of the power supply unit and/or to determine or at least assist in determining the resonance frequency.

A device with a particularly small size and low weight that is particularly convenient for an operator may be obtained if the power supply unit and the working head are interconnect by means of a cable. Hence, the working head may be formed as a handheld device.

In order to generate high frequency alternating current the power supply unit may comprise an inverter or a converter. A converter may be applied if the power supply unit itself is foreseen to be powered by AC power supply, whereas an inverter may be applied if the power supply unit is to be powered by e.g. a battery.

Particularly high power may be induced in a sheet metal structure if the converter is a full-bridge converter, respectively the inverter is a full-bridge inverter. However, depending on the application also other types of converters, respectively inverters, may be used, such as half-bridge types.

In order to maximize the generated alternating current in the sheet metal structure, the operating frequency of the inverter or of the converter may be adjustable in order to tune it to the resonance frequency of the resonance circuit arrangement.

Efficient heating in e.g. a sheet metal structure made from aluminum may be obtained if the generated alternating current has an operation frequency of between 55 kHz (kilohertz) and 65 kHz (kilohertz), preferably between 58 kHz and 62 kHz.

Particularly good results may be obtained if the power supply unit, the control unit and the working head are configured such that an impedance matching network with an envelope of modulation of about 50 Hz (hertz) and an operation frequency of about 60 kHz (kilohertz) is obtained.

For some applications, the power supply unit and the control unit may be arranged in the same housing. However, the control unit may also be at least partially arranged in the working head or in a separate housing.

Depending on the application the device may comprise a means to set the specified duration of a power sequence of current pulses and/or the number of current pulses of a power sequence of current pulses and/or the amplitude of modulation. Hence overheating of a sheet metal structure may be prevented. In order to set these parameters, the device may comprise a user interface configured to set at least one of these parameters. However, the parameters may also be set based on information regarding the material (e.g. type of alloy) and/or geometry (e.g. thickness) of the sheet metal structure.

For some applications, the method may comprise the method step of obtaining at least one method parameter from a database. Such a method parameter may be a preset resonance frequency, a preset number of calibration or power current pulses, a preset duration of a calibration or power current pulse, the type of modulation of a calibration or power current pulse. E.g. the method may comprise the method step of retrieving a preset resonance frequency from a database, the preset resonance frequency subsequently being used in order to set a frequency for the at least one calibration current pulse. Based on the preset resonance frequency retrieved from the database, in a further method step a frequency range from a certain frequency below the preset resonance frequency to a value above to preset resonance frequency may be calculated and swept with at least one calibration current pulse (respectively a sequence of multiple calibration current pulses) in order to determine (respectively approximate) the (actual) resonance frequency of the resonance circuit arrangement. The preset frequency may be obtained based on data provided to the method. Such data may include information regarding the type of alloy and/or geometry (e.g. the thickness) of the sheet metal structure. If the method is to be used in order to treat a vehicle (e.g. an air, land or water vehicle), at least one method parameter may be retrieved based on the type of vehicle and/or part of the vehicle to be treated. For example a preset resonance frequency may be retrieved from a database by providing a serial number or type designation (e.g. Land Rover Defender 110, 2010 model) and the part to be treated (e.g. hood). Alternatively or in addition the method may also comprise the method step of providing information to a database, e.g. method parameters applied to a specific area of a sheet metal structure. As well, temperature and/or position and/or motion as measured during a treatment may be provide to a database. Hence treatment may be recorded/logged for quality assurance and/or to be retrieved for future treatments on the same type of sheet metal structure. Hence a device according to the invention may comprise a database to store method parameters and/or comprise an interface to access a database containing method parameters or other information (e.g. via the World Wide Web). A working head for a device as described herein will usually comprise at least one magnetic field generator for generating a magnetic field, comprising at least one electrical work coil and at least one essentially U-shaped core, said core comprising a first and a second leg and a yoke portion, as well as at least one electrical work coil being interconnected with the U-shaped core. The first and the second leg each comprise a free end and a connecting end, the connecting end of the first leg and the connecting end of the second leg being arranged at the yoke portion, wherein the distance between the free end of the first leg and the free end of the second leg being less than the distance between the connecting end of the first leg and the connecting end of the second leg.

In order to increase current induced in an adjacent sheet metal structure, the free end of the first leg may comprise a protrusion that protrudes in direction of the free end of the second leg and/or the free and of the second leg comprises a protrusion that protrudes in direction of the free end of the first leg. Good results may be obtained if the first and the second end each comprise a protrusion, which protrusions being arranged such that they converge to each other.

The working head may comprise a housing with at least one working face foreseen to be brought in contact with an area to be treated in a sheet metal structure. Usually, the working face will be brought in loose contact with a dent; hence no adhesives will be needed in order to establish contact. For some types of sheet metal structures an auxiliary sheet (e.g. a fabric or film material) may be arranged between the working head and the sheet metal structure, e.g. in order to protect a sensitive coat of varnish arranged on the surface of the sheet metal structure from being mechanically damaged.

For some applications, a working head may comprise a vacuum system arranged to establish a mechanical interconnection (respectively some type of adherence) between the working head and a sheet metal structure to be treated. Good results may be obtained if the working head comprises a working face with a vacuum means arranged to obtain a vacuum to a sheet metal structure the working head is brought in contact with. Hence alignment of the working head may be improved. For some applications, the vacuum system may be used in order to detect proper alignment, respectively positioning, of the working head on a sheet metal structure to be treated. As such, in a variation of the invention a working head, respectively device according to the invention as described herein may measure air-pressure in a vacuum system in order to trigger a calibration and/or a power current pulse, respectively to prevent initiation of such pulses. Thus the occurrence of failure of treatment due to mishandling of the working head, respectively device, may be reduced. Alternatively or in addition, the vacuum system may be used in order to determine if two subsequent treatments with the method as described herein are applied to the same area of a sheet metal structure or to different areas (respectively if a working head has been moved between the two treatments. This information may be used in order to obtain method parameters as used for the method. Hence, e.g. if a movement of the working head is detected, the method parameters may be reset to initial standard values, whereas they may be adjusted based on the method parameters used in an antecedent treatment if the same area is treated (respectively the working head has not been moved).

Alternatively or in addition, a working head (or a device the working head is interconnected with) may comprise at least one sensor to measure the temperature of a sheet metal structure to be treated. Such a sensor may e.g. to measure the surface temperature. Such as sensor may comprise a contact thermo-sensor and/or a non-contact thermo-sensor (such as a sensor that measures thermal radiation). Thus overheating of the sheet metal structure and/or e.g. of a coat of varnish may efficiently be prevented, even if the thermal behavior of the sheet metal structure is unknown prior to the application of the heating process.

For some applications, the free end of the first leg and/or the free end of the second leg may comprise an active face configured to align with a sheet metal structure. Such an active face may align with a working face of a housing (if present) and/or may form a working face of a housing.

Particularly high currents induced in a sheet metal structure may be obtained if the area of the active face of the free end of the first leg is smaller than the mean cross-section of the first leg and/or the active face of the free end of the second leg is smaller than the mean cross-section of the second leg. Hence the protrusion and/or the legs may be tapered. Good results may be obtained if at least one protrusion is essentially shaped like a frustum.

For some application the at least one U-shaped core may be integrally made. For other applications the at least one U-shaped core may be made from at least two bodies. In particular, the at least one U-shaped core may e.g. be made from three bodies. However, the U-shaped core may also be made e.g. from five bodies, a first body forming a yoke portion, a second body forming a first leg, a third body forming a second leg, as well as two protrusion bodies arranged at the free ends of the first, respectively the second leg forming protrusions. Therefore, the bodies may be mechanically interconnected e.g. by means of a glue. Hence U-shaped cores with relatively complex shapes, can be obtained relatively easily, based on simple fundamental geometric bodies. Thus, U-shaped cores with geometries optimized for particular sheet metal structures can be built in an economic way.

In order to apply particularly high currents to an area of a sheet metal structure to be treated, the at least one U-shaped core may be at least partially made from a magnetic powder material in order to withstand particularly high magnetic flux. Good results may be obtained if the core is at least partially made from Sendust material.

In order to improve monitoring of heating, the working head may have a working face that comprises a recess for visual control of a heating process (respectively dent removing process). A recess may extend persistently across the working face and divide the working face in at least two sections.

Alternatively or in addition, the working head may comprise an illumination device in order to illuminate the area to be treated and/or an adjacent area of a sheet metal structure to be treated. Hence, visual control of the treatment (e.g. dent removal or loosening of an adhesive connection) may be improved/assisted. Good results may be obtained if the illumination device comprises a LED module and/or a fluorescent lamp and/or a laser. If the working head comprises a recess as described above, the recess may be illuminated. For some purposes the illumination device may be arranged such that at least one specific pattern can be projected on the sheet metal structure. Thus, e.g. progress/outcome of a dent removal process may be visually monitored very precisely.

Alternatively or in addition the working head, respectively device, may comprise a position detector and/or a motion detector in order to detect/monitor the effect of performing the method as described herein has on the geometry of the sheet metal structure to be treated with it. Such a detector may e.g. comprise a laser rangefinder device and/or an ultrasound module. In particular the Doppler shift may be used in order to determine the deformation mode of a dent. Information determined with such detectors may be used in order adjust the calibration current pulse and/or the power current pulse and/or to inhibit further current pulses in case the method does not have a certain effect. In particular, measurements of a position detector and/or a motion detector during the treatment of at least one area of a sheet metal structure may be used in order to adjust at least one calibration current pulse and/or at least one power current pulse of at least one area subsequently to be treated. Hence the outcome of treatments can be improved.

The working head may comprise a cooling system in order to dissipate thermal energy from the magnetic field generator.

For some applications at least one capacitor may be arranged in the working head, the capacitor being electrically interconnected with the work coil in series. Hence a resonant circuit arrangement may be formed. Good results may be obtained if the at least one capacitor is formed as a capacitor bank. For some high-power applications, the working head may comprise a first and a second capacitor bank, the first and the second capacitor bank being electrically interconnected in series. Such an arrangement can withstand high electrical voltage occurring when in resonance. As well, depending on the arrangement, cooling of the capacitors can be improved. Further capacitors may be present.

BRIEF DESCRIPTION OF SEVERAL VIEWS OF THE DRAWINGS

The herein described invention will be more fully understood from the detailed description of the given herein below and the accompanying drawings, which should not be considered as limiting to the invention described in the appended claims.

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
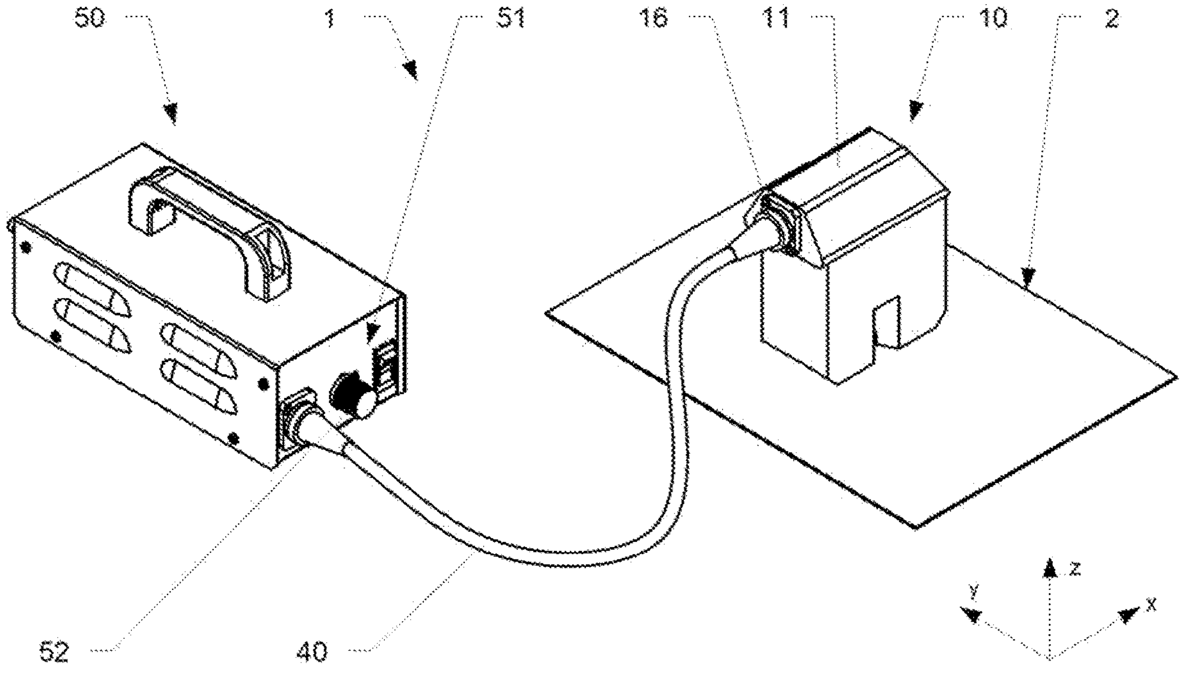
FIG. 1 schematically shows an embodiment of a device for removing dents from a perspective view from above.

FIG. 1 shows a device 1 for removing dents from a sheet metal structure 2. The device 1 comprises a working head 10 and a power supply unit 50, which comprises a power supply control unit 51 that comprises a user interface 52 which allows a user to set certain settings. By means of the user interface 52 a user/operator may provide the controller with information regarding the sheet metal structure to be processes. This information may include data regarding the material (e.g. type of alloy) as well as geometry (e.g. thickness of a sheet metal structure) as well as data regarding the type of process to be performed (dent removal, local heating . . . ). The working head 10 comprises a housing 11 and a connector 16 that serves in order to connect the working head 10 to the power supply unit 50 by means of a cable 40.

Figure 3:
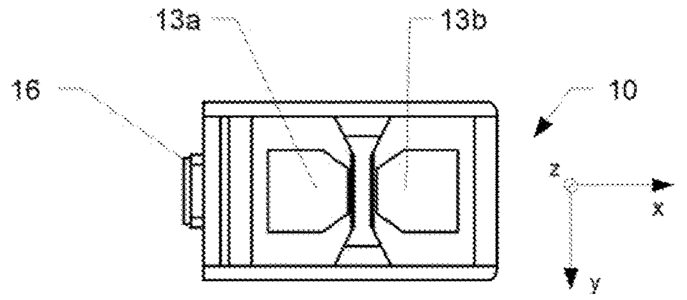
FIG. 3 schematically shows the working head of FIG. 2 from below.
Figure 2:
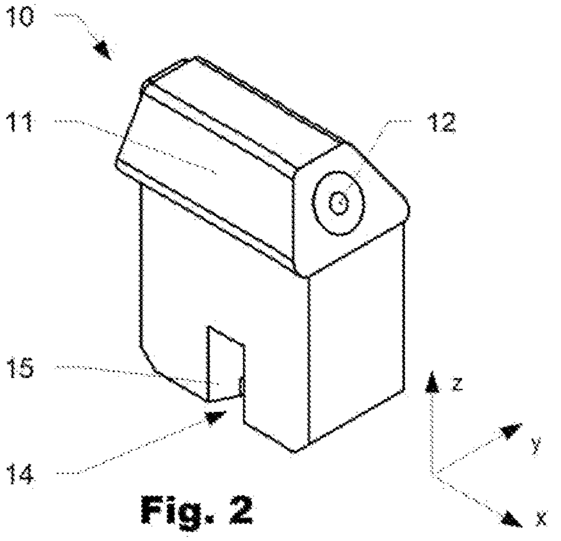
FIG. 2 schematically shows an embodiment of a working head in a perspective view from above.
Figure 4:
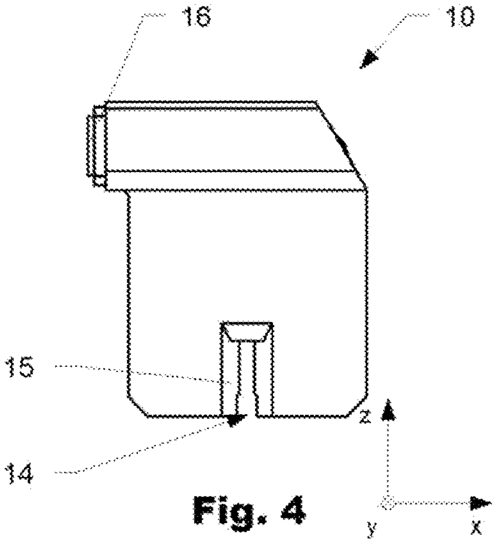
FIG. 4 schematically shows the working head of FIG. 2 from the side.

FIGS. 2, 3 and 4 show the embodiment of a working head 10 of FIG. 1. The working head 10 comprises a housing 11 which has a working face 13 to be aligned with a sheet metal structure 2 to which the working head 10 is to be applied. The embodiment of a working head 10 shown also comprises an activating means 12, which is essentially a button, by which a process according to invention as described herein can be initiated and/or be stopped. The embodiment of a working head 10 shown comprises a recess 14 that is arranged at a bottom portion of the housing 11. The recess 14 is arranged approximately in the middle of the working face 13*a,b* and formed like a groove. The recess 14 may comprise chamfers 15 which facilitate visual inspection of the area (e.g. dented region) of the sheet metal structure 2 that is to be treated during application of the method according to the invention as described herein.

Figure 5:
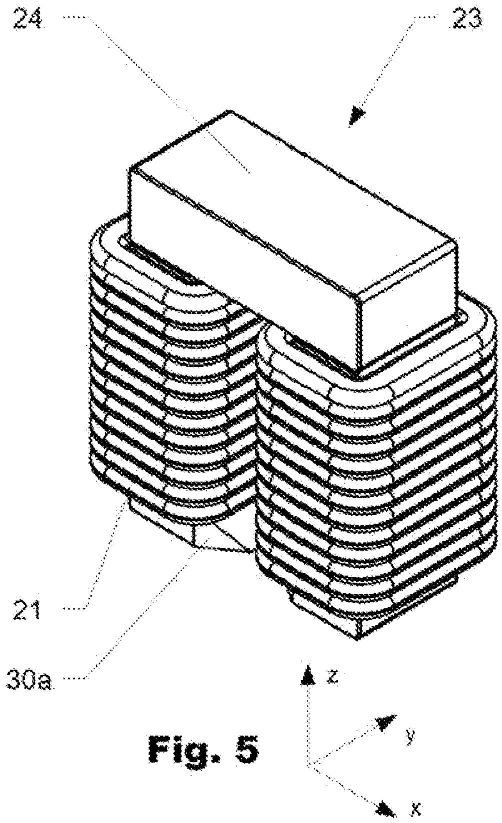
FIG. 5 schematically shows an embodiment of a U-shaped core with a work coil in a perspective view from above.
Figure 6:
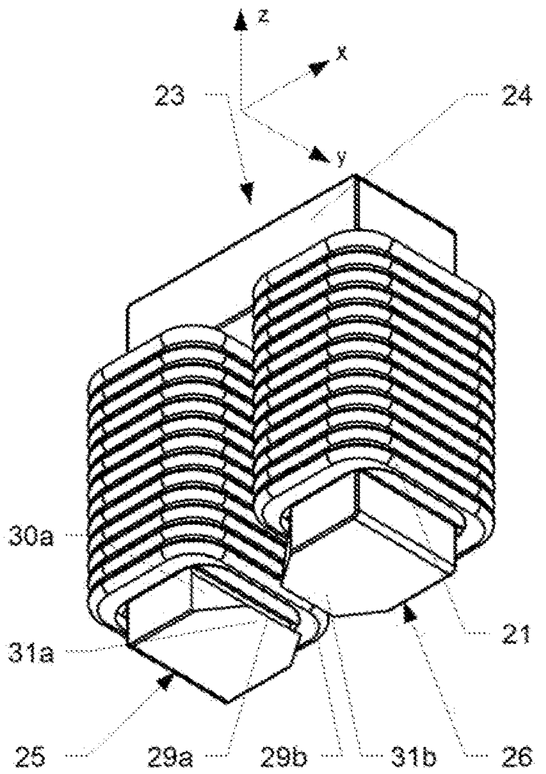
FIG. 6 schematically shows the U-shaped core with the work coil of FIG. 5 in a perspective view from below.
Figure 7:
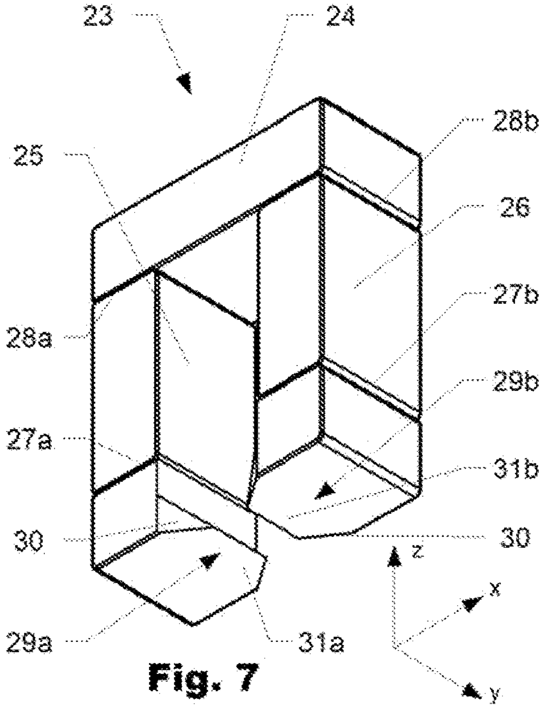
FIG. 7 schematically shows the U-shaped core of FIG. 5 in a perspective view from below.
Figure 8:
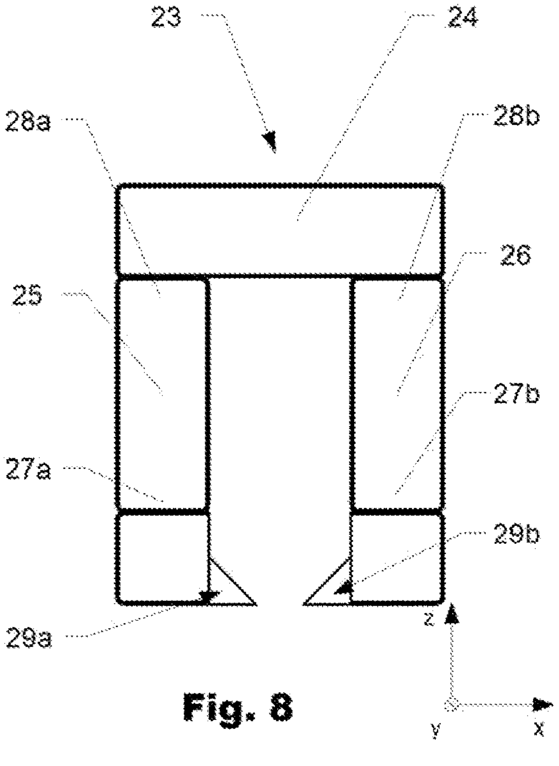
FIG. 8 schematically shows the U-shaped core of FIG. 5 in a perspective view from the side.

FIGS. 5 and 6 schematically show an embodiment of a U-shaped core 23 comprising a work coil 21 that is spatially divided into two sub-coils, as may be used in an embodiment of a working head 10 as shown in FIGS. 1 to 4. The U-shaped core 23 comprises a yoke portion 24 and a first and a second leg 25, 26. The first and the second leg 25, 26 have both have a free end 27*a,b* as well as a connecting end 28*a,b* which is interconnected with the yoke portion 24, as is shown in more detail in FIGS. 7 and 8 that show the embodiment of a U-shaped core 23 of FIGS. 5 and 6 when separated from the work coil 21. As shown the first and the second leg 25, 26 each comprise a protrusion 29*a,b* arranged at their free ends 27*a,b*. The protrusions 29*a,b* are arranged such that the distance between the free end 27*a* of the first leg 25 and the free end 27*b* of the second leg 26 is less than the distance between the connecting end 28*a* of the first leg 25 and the connecting 28*b* end of the second leg 26. As well, both free ends 27*a,b* comprise an active face 31*a,b* configured (respectively shaped) to align with a sheet metal structure (not shown) the method is to be applied to. Thus, the magnetic field can be focused to the area of the sheet metal structure to be treated and consequently particularly high currents and resulting heating can be obtained. In order to increase focusing of the magnetic field, the free ends 27*a,b* (respectively the protrusions 29*a,b*) of the embodiment shown comprise narrowings 30. Hence the areas of the active faces 31*a,b* (respectively the parts of the effective faces that are in proximity with the sheet metal structure) may be smaller than the mean cross-section of the first and second leg 25, 26. The embodiment of a U-shaped core 23 as shown in FIGS. 5 to 8 is made from five bodies that are mechanically interconnected with each other. Good results may be obtained if the bodies are interconnected by means of an adhesive agent, in particular by means of a heat-resistant adhesive agent. A first body forms the yoke portion 24, a second body forms the first leg 25, a third body forms the second leg 26, whereas the protrusions 29*a,b* are both formed by separate bodies arranged at the free ends 27*a,b* of the first and the second leg 25, 26. Thus the U-shaped core can be assembled based on three bodies that have a relatively simple standardized geometry and two bodies that may be specifically built based on the sheet metal structure and/or application the U-shaped core 23 is to be used for. The five bodies of the embodiment shown may be made from a magnetic powder.

Figure 9:
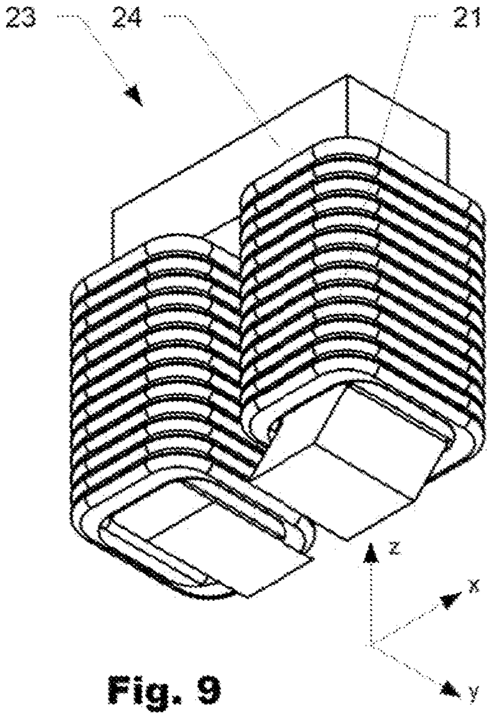
FIG. 9 schematically shows another embodiment of a U-shaped core with a work coil in a perspective view from below.
Figure 10:
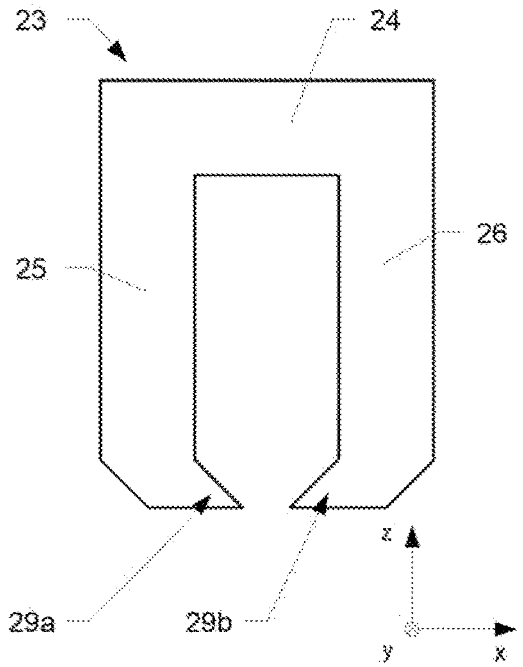
FIG. 10 schematically shows the U-shaped core of FIG. 9 from the side.

FIGS. 9 and 10 shown another embodiment of a U-shaped core 23 with and without a work coil 21. As shown in FIG. 10, the U-shaped core is integrally made, hence may e.g. be a machined ferrite core. However, in order to be able to withstand particularly high magnetic flux, the core may also be made from a magnetic powder, such as by a sintering.

Figure 11:
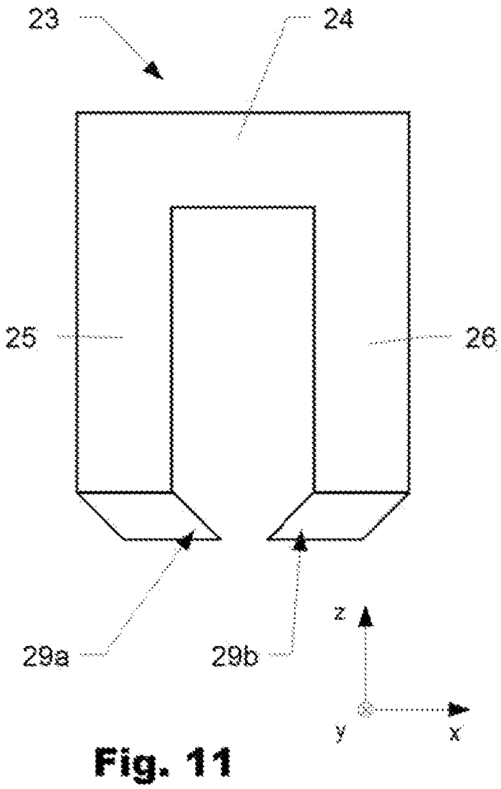
FIG. 11 schematically shows another embodiment of a U-shaped core from the side.

FIG. 11 shows another embodiment of a U-shaped core 23 that is assembled from three different bodies. A first body forms the main portion of the U-shaped body and two further bodies arranged at the free ends 27*a,b* of the first and the second leg 25, 26 of the U-shaped body form protrusions 29*a,b*.

Figure 12:
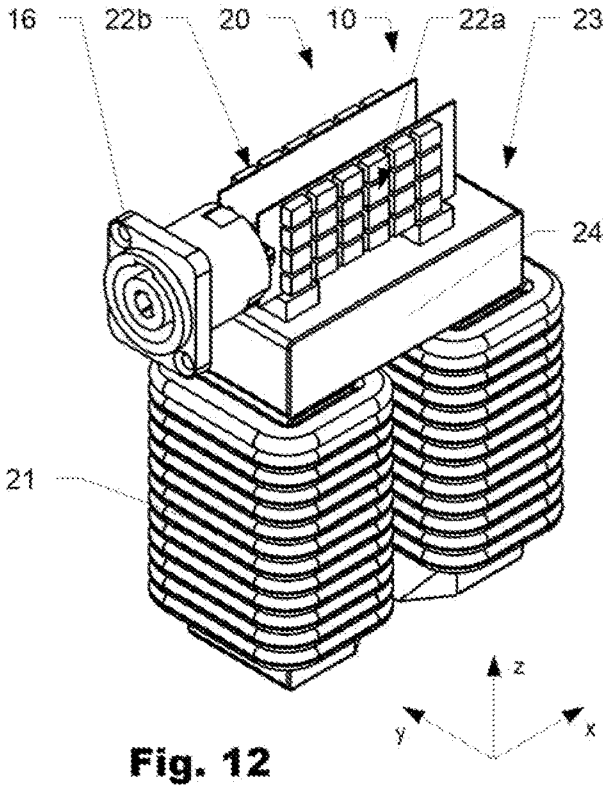
FIG. 12 schematically shows another embodiment of a working head with a magnetic field generator, a U-shaped core with a work coil and two capacitor banks in a perspective view from above.

FIG. 12 shows another embodiment of a working head 10 comprising a magnetic field generator 20, a U-shaped core 23 with a work coil 21 and a capacitor that comprises two capacitor banks 22*a,b* which are interconnected with each other and the work coil 21 in series. Thus, overcritical voltage when operating at the resonance frequency of a resonance circuit arrangement can be prevented, as well as cooling (respectively dissipation of thermal energy) of the working head can be increased.

The invention claimed is:

1. A method for inducing local heating in a sheet metal structure (2), comprising the method steps of:

a. providing a sheet metal structure (2) comprising an area to be heated;

b. providing a magnetic field generator (20) for generating a magnetic field, wherein the magnetic field generator (20) comprises at least one electrical work coil (21) and is arranged in a working head (10), wherein the working head (10) further comprises providing at least one essentially U-shaped core (23), said U-shaped core (23) comprising a first and a second leg (25, 26) and a yoke portion (24), the at least one electrical work coil (21) being interconnected with the U-shaped core (23);

providing the first and the second leg (25, 26) each comprising a free end (27*a,b*) and a connecting end (28*a,b*), the connecting ends (2,*a,b*) being arranged at the yoke portion (24), wherein the distance between the free end (27*a*) of the first leg (25) and the free end (27*b*) of the second leg (26) is less than the distance between the connecting end (28*a*) of the first leg (25) and the connecting end (28*b*) of the second leg (26);

interconnecting the working head (10) electrically with a power supply unit (50), wherein the power supply unit (50) is configured to provide an alternating current and wherein the operation of the power supply unit (50) is controlled by a power supply control unit (51), wherein the power supply unit (50), the working head (10) with the magnetic field generator (20), and the power supply control unit (51) are arranged in a device (1) for inducing local heating in the sheet metal structure (2);

c. positioning the magnetic field generator (20) adjacent to the sheet metal structure (2) in the area to be treated such that it forms a resonance circuit arrangement together with the sheet metal structure (2);

d. applying at least one calibration current pulse having a specific frequency to the resonance circuit arrangement in order to determine the resonance frequency of the resonance circuit arrangement, wherein the at least one calibration current pulse is formed to prevent induction of high eddy currents; and e. applying at least one power current pulse to the resonance circuit arrangement with the operation frequency of the current pulse corresponding to the resonance frequency of the resonance circuit arrangement as determined by the at least one calibration current pulse, wherein the at least one power current pulse is formed to induce high eddy currents.

2. The method according to claim 1, wherein a sequence of calibration current pulses is applied to the resonance circuit arrangement in order to determine the resonance frequency of the resonance circuit arrangement.

3. The method according to claim 2, wherein the current pulses of the calibration sequence of current pulses have frequencies that differ from each other and that are between 58 kHz (kilohertz) and 62 kHz (kilohertz).

4. The method according to claim 2, wherein the calibration sequence of current pulses comprises between 10 and 20 current pulses.

5. The method according to claim 2, wherein the duration of each pulse of the calibration sequence of current pulses is between 15 ms and 20 ms (milliseconds).

6. The method according to claim 2, wherein a sequence of power current pulses is applied, having an envelope of modulation 50Hz and operation frequency that is equal to the resonance frequency of the resonant circuit arrangement.

7. The method according to claim 1, wherein two sequences of power current pulses are separated by a minimum time period.

8. The method according to claim 1, wherein the number of power current pulses and/or the maximum total duration of the sequence of power current pulses can be preset.

9. The method according to claim 1, wherein the power supply unit (50) and the working head (10) are interconnected by means of a cable (40).

10. The method according to claim 1, wherein the power supply unit (50) comprises an inverter or a converter to generate high frequency alternating current.

11. The method according to claim 10, wherein the converter is a full-bridge converter or the inverter is a full-bridge inverter.

12. The method according to claim 10, wherein the operating frequency of the inverter or of the converter is adjustable in order to tune it to the resonance frequency of the resonance circuit arrangement.

13. The method according to claim 12, wherein the generated alternating current has an operation frequency of between 55 kHz (kilohertz) and 65 kHz (kilohertz), preferably between 58 kHz and 62 kHz.

14. The method according to claim 1, wherein the power supply unit (50), the control unit (51) and the working head (10) are configured such that an impedance matching network with an envelope of modulation of about 50 Hz and an operation frequency of about 60 kHz is obtained.

15. The method according to claim 1, wherein the power supply unit (50) and the control unit (51) are arranged in the same housing.

16. The method according to claim 1, wherein the control unit (51) comprises a means to set the specified duration of a power sequence of current pulses and/or the number of current pulses of a power sequence of current pulses.

17. The method according to claim 1, wherein the free end (27*a*) of the first leg (25) comprises a protrusion (29*a*) that protrudes in direction of the free end (27*b*) of the second leg (26) and/or the free and (27*b*) of the second leg (26) comprises a protrusion (29*b*) that protrudes in direction of the free end (27*a*) of the first leg (25).

18. The method according to claim 1, wherein the working head (10) comprises a housing (11) with at least one working face (13*a,b*) foreseen to be brought in contact with an area to be treated in a sheet metal structure (2).

19. The method according to claim 1, wherein the free end (27*a*) of the first leg (25) and/or the free end (27*b*) of the second leg (26) comprises an active face (31*a,b*) configured to align with a sheet metal structure (2).

20. The method according to claim 18, wherein an area of the active face (31*a*) of the free end (27*a*) of the first leg (25) is smaller than a mean cross-section of the first leg (25) and/or the active face (31*b*) of the free end (27*b*) of the second leg (26) is smaller than a mean cross-section of the second leg (26).

21. The method according to claim 1, wherein the at least one U-shaped core (23) is integrally made.

22. The method according to claim 1, wherein the at least one U-shaped core (23) is made from at least two bodies.

23. The method according to claim 1, wherein the at least one U-shaped core (23) is at least partially made from a magnetic powder material.

24. The method according to claim 1, wherein the working head (10) comprises a cooling system in order to dissipate thermal energy from the magnetic field generator (20).

25. The method according to claim 1, wherein at least one capacitor (22*a,b*) is arranged in the working head (10), the capacitor (22*a,b*) being electrically interconnected with the work coil (21).

26. The method according to claim 25, wherein the at least one capacitor (22*a,b*) is formed as a capacitor bank (22*a,b*).

27. The method according to claim 26, wherein the working head (10) comprises a first and a second capacitor bank (22*a,b*), the first and the second capacitor bank (22*a,b*) being electrically interconnected in series.

28. The method according to claim 1 further comprising removing dents from a sheet metal structure (2) made from a non-ferromagnetic material.

29. The method according to claim 1 further comprising loosening or breaking an adhesive connection in the sheet metal structure (2).

30. The method according to claim 1 further comprising removing a sticker from a sheet metal structure (2).

* * * * *